(12) United States Patent
Sachse

(10) Patent No.: US 12,180,932 B2
(45) Date of Patent: Dec. 31, 2024

(54) METHOD OF OPERATING AN ELECTRICAL HEATING ELEMENT

(71) Applicant: Nordex Energy SE & Co. KG, Hamburg (DE)

(72) Inventor: Konrad Sachse, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/513,195

(22) Filed: Nov. 17, 2023

(65) Prior Publication Data

US 2024/0200537 A1 Jun. 20, 2024

(30) Foreign Application Priority Data

Dec. 16, 2022 (EP) ..................................... 22214184

(51) Int. Cl.
*F03D 17/00* (2016.01)
*F03D 80/40* (2016.01)

(52) U.S. Cl.
CPC ......... *F03D 17/021* (2023.08); *F03D 80/401* (2023.08)

(58) Field of Classification Search
CPC ....... F03D 17/021; F03D 80/40; F03D 80/401
See application file for complete search history.

(56) References Cited

U.S. PATENT DOCUMENTS 4,638,960 A * 1/1987 Straube .............. G05D 23/2401
244/134 F
2003/0178412 A1 9/2003 Goldberg et al.
2020/0300226 A1 * 9/2020 Buggy .................... F03D 80/40
2021/0148338 A1 * 5/2021 Wood ...................... F03D 80/40
2022/0049683 A1 * 2/2022 Roed .................... F03D 80/401
2022/0074392 A1 * 3/2022 Oliver ..................... F03D 17/00
2022/0397098 A1 * 12/2022 Klümper ................ F03D 80/60
2023/0407849 A1 * 12/2023 Bosukonda ............ F03D 7/048

FOREIGN PATENT DOCUMENTS

CN          111963393 B  *  9/2022  .......... F03D 1/0675
EP          3 436 698 B1    2/2019
EP          3 919 740 A1   12/2021

OTHER PUBLICATIONS

Extended Search Report of the European Patent Office dated Jun. 14, 2023 for European application 22214184.8 on which this application is based.

* cited by examiner

*Primary Examiner* — Tulsidas C Patel
*Assistant Examiner* — Thomas K Quigley
(74) *Attorney, Agent, or Firm* — Walter Ottesen, P.A.

(57) ABSTRACT

A method is for operating an electrical heating element of a wind turbine rotor blade. The method includes: applying a voltage to the heating element, measuring a current flowing through the heating element, measuring the voltage applied to the heating element, calculating a reference current by applying a normalization factor to the measured current, wherein the normalization factor corresponds to the ratio of a nominal voltage to the measured voltage, triggering an action when the reference current is outside a first predetermined reference current range.

20 Claims, 6 Drawing Sheets

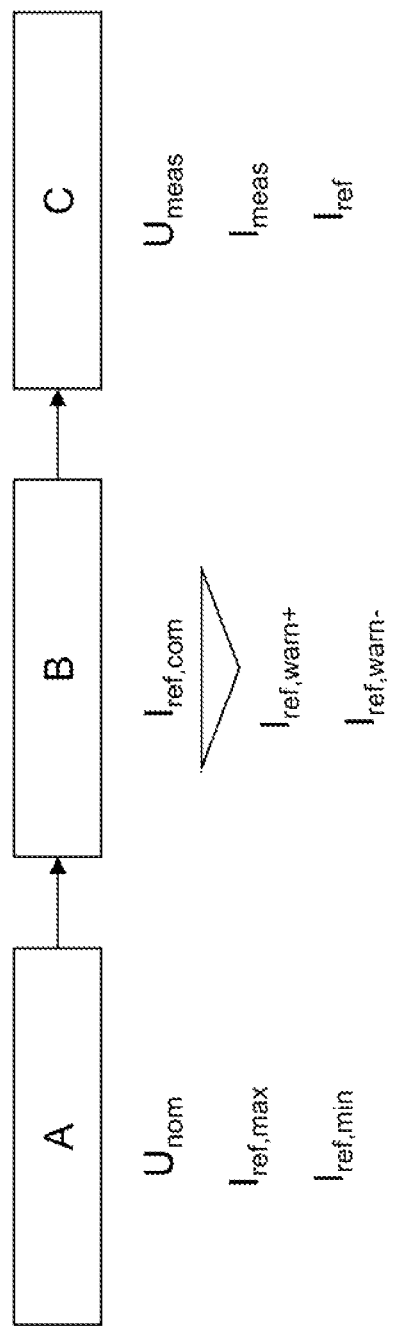

METHOD OF OPERATING AN ELECTRICAL HEATING ELEMENT

CROSS-REFERENCE TO RELATED APPLICATIONS

This application claims priority of European patent application no. 22 214 184.8, filed Dec. 16, 2022, the entire content of which is incorporated herein by reference.

TECHNICAL FIELD

This disclosure relates to the technical field of wind turbines with rotor blade heating systems. Some rotor blade heating systems use electrothermal heating (ohmic resistors) to reduce, avoid or melt ice accretion on the rotor blade surface. To monitor the condition of the heating system, electrical quantities such as electric current and electric voltage can be used.

BACKGROUND

It is common practice in such systems to calculate the electrical resistance (voltage divided by current) and monitor this value over time. Changes of the electrical resistance indicate changes of the ambient conditions (e.g. temperature) or of the electrical properties. The latter can be induced by mechanical or electrical damages of the heating system which can be detected by means of the monitoring and actions can be taken accordingly. The document US 2020/0300226 A1 describes such monitoring by means of the calculation of electrical resistance values.

SUMMARY

It is an object of the disclosure to provide an alternative method of operating an electrical heating element of a wind turbine rotor blade as well as a wind turbine carrying out this method.

This object is, for example, solved by a method of operating an electrical heating element of a wind turbine rotor blade according to the disclosure and by a wind turbine according to the disclosure.

A method of operating an electrical heating element of a wind turbine rotor blade includes the following steps:
- applying a voltage to the heating element,
- measuring a current flowing through the heating element,
- measuring the voltage applied to the heating element,
- calculating a reference current by applying a normalization factor to the measured current, wherein the normalization factor corresponds to the ratio of a nominal voltage to the measured voltage,
- triggering an action when the reference current is outside a first predetermined reference current range.

The method including each of its steps can be carried out completely automatically, in particular by an electronic controller such as a wind turbine controller or a wind turbine heating system controller. The steps of the method need not be carried out in the given order, for example the two steps of measuring the voltage and the current, respectively, can be carried out in particular simultaneously or almost simultaneously.

The electrical heating element is mounted to and/or integrated into a wind turbine rotor blade. The heating element may include an ohmic resistor, for example at least one layer including carbon fibers and/or metal wires. The at least one layer is arranged on or close to a surface of the wind turbine rotor blade such that a temperature of the surface can be raised by generating thermal energy by means of a heating current guided through the heating element. The thermal power corresponds to the electrical power consumed by the heating element, and will be proportionate to product of the voltage applied to the heating element and the current flowing through the heating element. Depending on the operating scheme, the power and/or surface temperature can be controlled such that the formation of ice on the surface is prevented (anti-icing) and/or such that ice already formed on the surface is melted and/or removed from the surface (de-icing).

Of course, a heating system of a wind turbine typically includes a plurality of heating elements. The method can be carried out individually for each of the heating elements. In the alternative, the method can be carried out for groups of heating elements, for example, a voltage applied to a group of heating elements and a current flowing through the group of heating elements can be measured, and a reference current can be calculated for this group of heating elements. The group of heating elements may include multiple heating elements connected in series or connected in parallel. For example, there may be one group of heating elements for each rotor blade of the wind turbine, so that a reference current is calculated for each rotor blade. In another example, all of the heating elements of the wind turbine may form a single group.

In accordance with the method, a reference current is determined which is based on a measured current flowing through the heating element. However, the measured current will be influenced not only by the properties of the heating element and by the operating conditions such as the ambient temperature, but also by any fluctuations of the voltage applied to the heating element. These fluctuations do not include information on the condition of the heating element. For this reason, it is desired to exclude the influence of the voltage fluctuations on the current. In order to do so, a reference current is calculated by applying a normalization factor to the measured current. The normalization factor corresponds to the ratio of a nominal voltage to the measured voltage. The calculated reference current therefore corresponds to the current that would flow through the heating element if the nominal voltage was applied to the heating element.

In other words, the reference current can be calculated as follows:

$$I_{ref} = I^*_{meas}(U_{nom} / U_{meas})$$

wherein $I_{ref}$ is the reference current, $I_{meas}$ is the measured current, $U_{nom}$ is the nominal voltage of the heating element, and $U_{meas}$ is the measured voltage applied to the heating element. The term $U_{nom}/U_{meas}$ is the normalization factor.

After having calculated the reference current, it is determined whether the reference current is outside a first predetermined range. If so, the controller triggers an action. The first predetermined range may be defined by an upper limit and by a lower limit. It may also be defined as a percentage of a certain, predetermined reference current value. In general, the first predetermined range is defined such that a reference current outside of that range gives reason to take a certain action, which is then triggered.

The disclosure provides an easy solution to monitor the condition of a heating element based on a simple measurement of the current flowing through the heating element. By applying the normalization factor, any influence of random voltage fluctuations in a supply grid, for example, are excluded, so that meaningful information on the condition of the heating element is obtained.

In an aspect, the reference current is monitored over time by continuously repeating the steps of measuring the current, measuring the voltage and calculating the reference current. For example, these steps may be repeated in intervals of 1 s, 10 s, 30 s or 1 minute. Changes in the condition of the heating element necessitating a certain action will thus be noticed in a timely manner.

In an aspect, no reference current is calculated and/or no action is triggered before the voltage has been applied to the heating element for a predetermined time. This ensures that artifacts occurring in the moment of switching will not be misinterpreted as necessitating a certain action.

In an aspect, no reference current is calculated and/or no action is triggered when the measured current is below a predetermined threshold. This may prevent division-by-zero errors.

In an aspect, no reference current is calculated and/or no action is triggered when the measured voltage is outside a predetermined voltage range. Measuring a voltage outside the predetermined voltage range may indicate problems with a power supply, and should not be misinterpreted as an undue condition of the heating element.

In an aspect, the step of measuring the voltage includes repeated measurements and determination of an average voltage, wherein in the subsequent step of calculating the reference current, the average voltage is used as the measured voltage. This helps to reduce fluctuations of the calculated reference current based on single extreme measurement values of the voltage.

In an aspect, the step of measuring a current includes repeated measurements and determination of an average current, wherein in the subsequent step of calculating the reference current, the average current is used as the measured current. This helps to reduce fluctuations of the calculated reference current based on single extreme measurement values of the current.

In an aspect, the first predetermined reference current range is stored in a control system after having been determined during commissioning of a wind turbine rotor blade heating system which includes the heating element. Determining the first predetermined reference current range during commissioning of the wind turbine rotor blade heating system allows for taking into account individual specifications and manufacturing tolerances, in contrast to using a "standard" reference current range for many rotor blade heating systems. For example, the predetermined reference current range can be determined based on a measurement of the electrical resistance of the heating element, and/or based on a certain nominal voltage of the rotor blade heating system.

In an aspect, the action triggered when the reference current is outside a first predetermined reference current range is selected from the following group of actions: stopping applying a voltage to the heating element, stopping a wind turbine heating system which includes the heating element, stopping the wind turbine, sending a notification, requesting a service team. Each of these actions or a combination thereof may be appropriate. A wind turbine controller may carry out one or more of these actions, possibly taking into account other data, such as present weather conditions. For example, if the reference current is outside the first predetermined range, it may be required to shut down the wind turbine immediately, in particular when the ambient temperature is very low. On other occasions, it may be sufficient to send a notification and/or to switch off the heating element only.

In an aspect, the method includes the following additional step:

triggering an action when the reference current is outside a second predetermined reference current range that is defined by general limitations of an electrical supply system.

The second predetermined reference current range may be wider than the first predetermined reference current range. A reference current outside this wider range may imply a severe problem and/or a risk to damage the electrical system. As a consequence, an appropriate action can be taken, in particular switching off the voltage applied to the heating element immediately.

The above object is, for example, also solved by a wind turbine having a wind turbine rotor blade with an electrical heating element, and a controller adapted to apply a voltage to the heating element, a voltage meter to measure the voltage applied to the heating element, and a current meter to measure a current flowing through the heating element, wherein the controller is adapted to calculate a reference current by applying a normalization factor to the measured current, wherein the normalization factor corresponds to the ratio of a nominal voltage to the measured voltage, and to trigger an action when the reference current is outside a first predetermined reference current range. The wind turbine and in particular its controller is adapted to carry out methods of the disclosure. With regard to the features and advantages of the wind turbine, reference is made to the above explanations of the related method, which apply to the wind turbine in a corresponding manner.

BRIEF DESCRIPTION OF DRAWINGS

The invention will now be described with reference to the drawings wherein.

DETAILED DESCRIPTION

Figure 1:
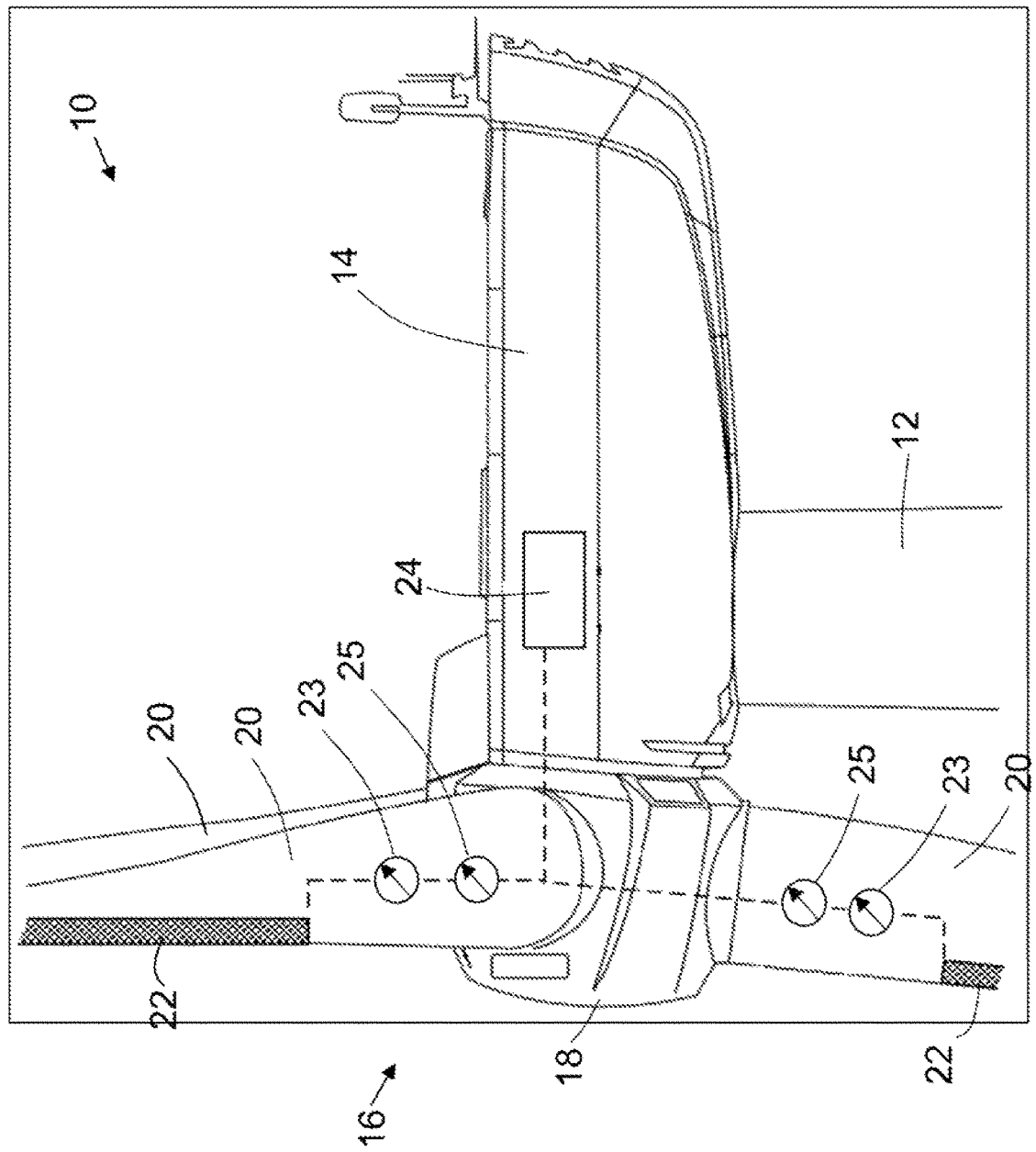
FIG. 1 is a schematic illustration of a wind turbine.

FIG. 1 shows a wind turbine 10 having a tower 12, a nacelle 14, and a wind turbine rotor 16 with a wind turbine rotor hub 18 and three wind turbine rotor blades 20. A heating element 22 is arranged on each wind turbine rotor blade 20 such that it covers a leading edge of the respective wind turbine rotor blade 20.

A controller 24 is arranged in the nacelle 14 and connected to each of the heating elements 22. The details of the electrical system are not shown. However, the controller 24, which forms a part of a wind turbine controller, is able to apply a voltage to each of the heating elements 22 (for example by closing a switch connecting the heating element 22 or a group of heating elements 22 to a power supply). This voltage and a current flowing through each of the heating elements 22 or through a group of heating elements 22 is measured by a voltage meter 23 and a current meter 25 respectively 2and the measured values are transferred to the controller 24.

Figure 2:
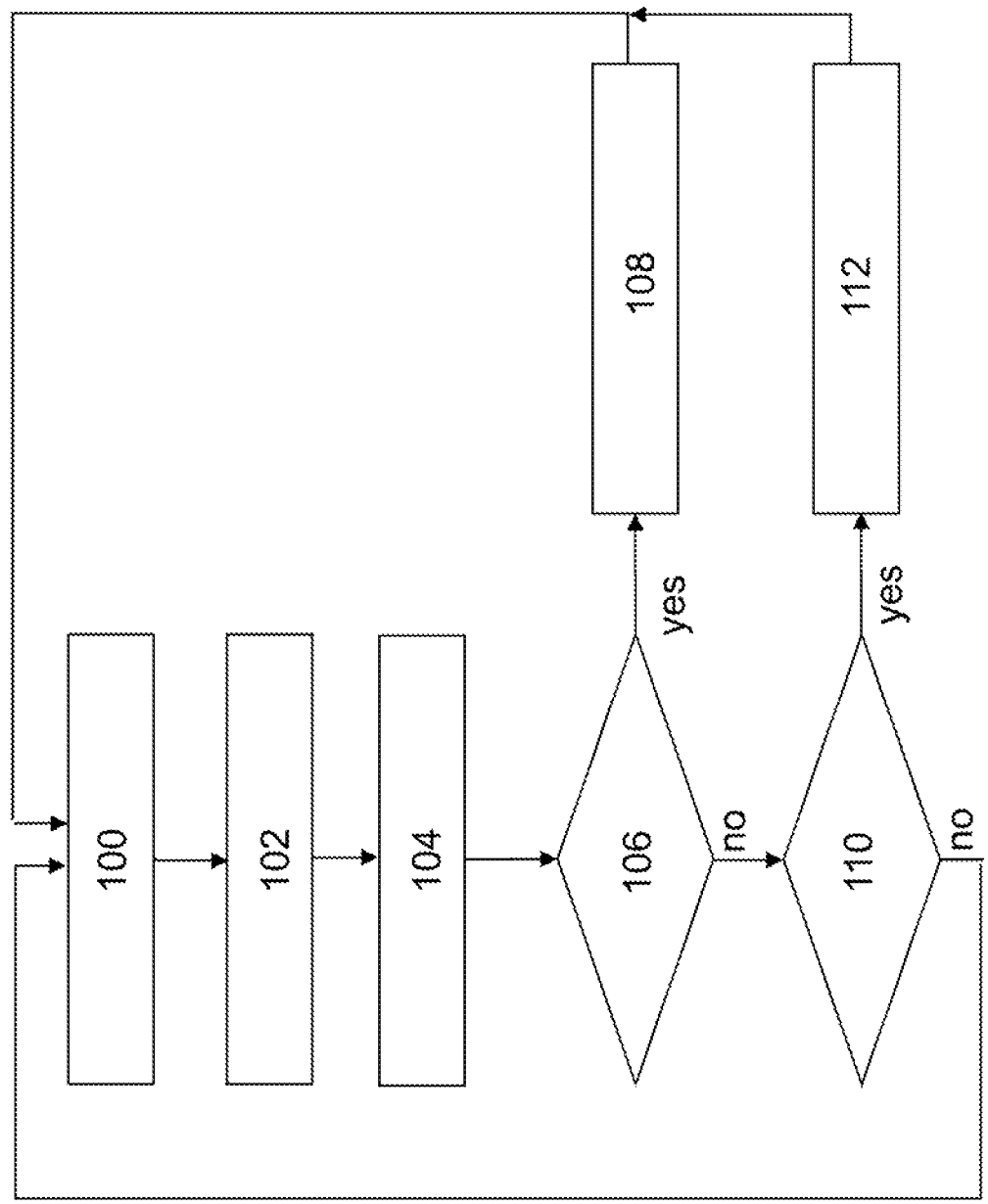
FIG. 2 is a flow diagram illustrating a method according to the disclosure.

FIG. 2 illustrates the steps of a method, presuming a voltage has already been applied to a heating element 22. In step 100, the current $I_{meas}$ flowing through the heating element 22 is measured. In step 102, the voltage $U_{meas}$ applied to the heating element 22 is measured.

In step 104, a reference current $I_{ref}$ is calculated by applying a normalization factor to the measured current $I_{meas}$, wherein the normalization factor corresponds to the ratio of a nominal voltage $U_{nom}$ to the measured voltage $U_{meas}$.

Figure 4:
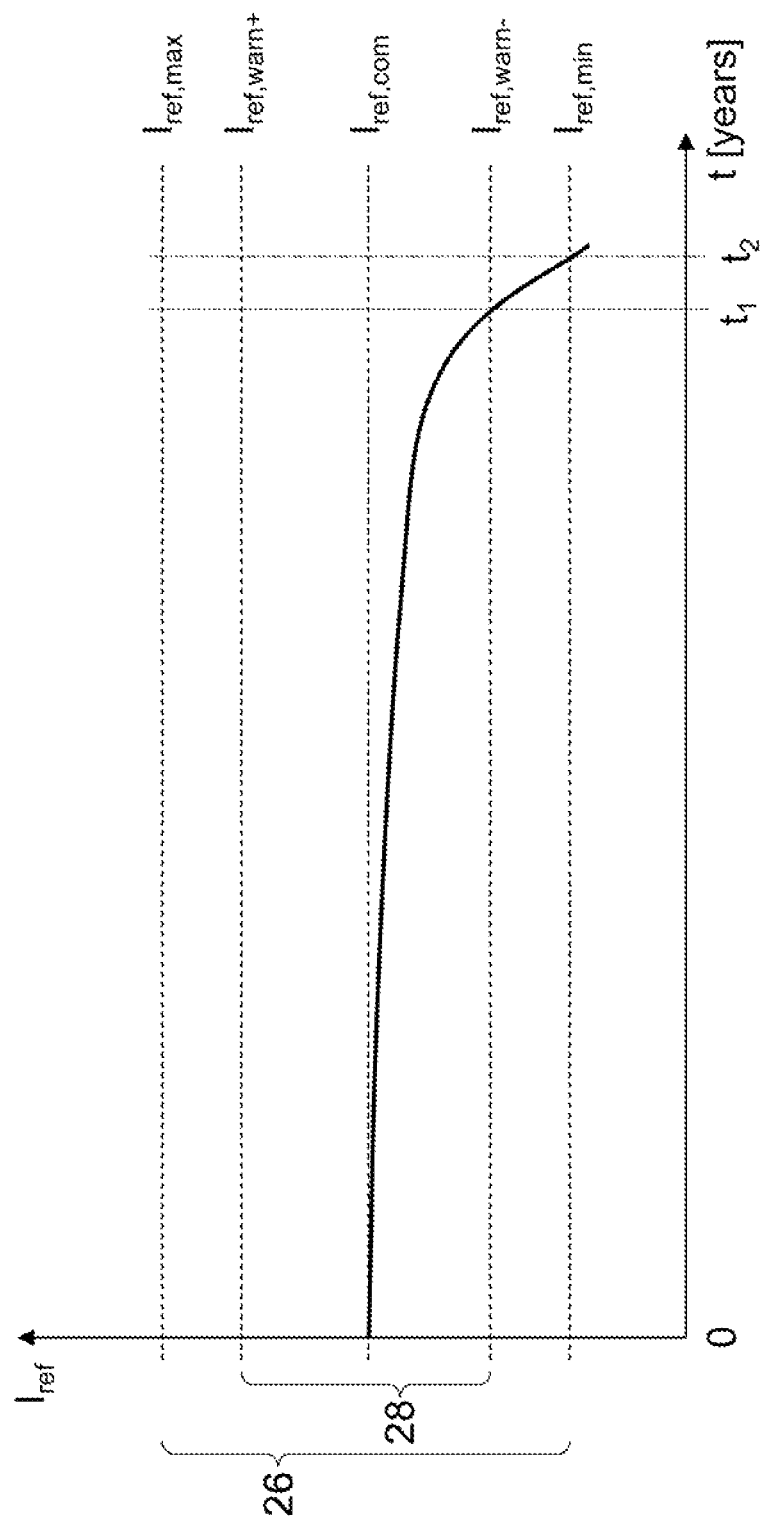
FIG. 4 is a diagram illustrating the long-term progression of a reference current of a typical heating element.

In step 106, it is determined whether the calculated reference current $I_{ref}$ is outside a second predetermined reference current range 26 (see FIG. 4). If so, the controller 24 in step 108 triggers an action, for example stops the application of voltage to the heating element 22.

In step 110, it is determined whether the calculated reference current $I_{ref}$ is outside a first predetermined reference current range 28 (see FIG. 4). If so, the controller 24 in step 112 triggers an action, for example sends a notification including a warning to a service team.

Figure 3:
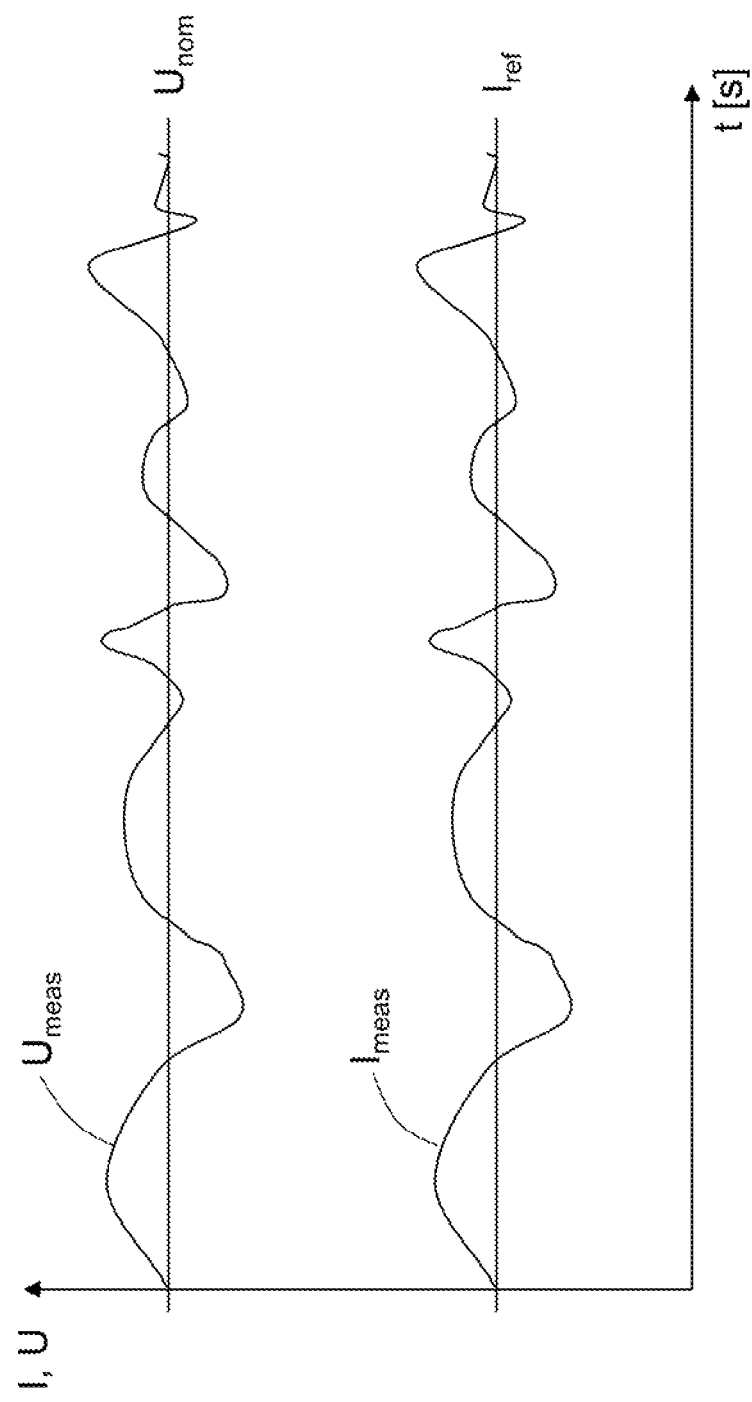
FIG. 3 is a diagram showing voltage and current measured over time.

FIG. 3 shows a measured current $I_{meas}$ and a measured voltage $U_{meas}$ over time. One can see the measured voltage $U_{meas}$ fluctuates around a nominal voltage $U_{nom}$, which is mainly due to fluctuations of a supply grid. The measured current $I_{meas}$ reflects these fluctuations. The reference current $I_{ref}$ calculated as $I_{ref}=I_{meas}*(U_{nom}/U_{meas})$ is shown as a straight line in the diagram, because it has been corrected for voltage-induced fluctuations.

FIG. 4 illustrates the long-term progression of a reference current $I_{ref}$ of a typical heating element 22. A first predetermined current range 28 is defined by an upper limit $I_{ref,warn+}$ and a lower limit $I_{ref,warn-}$. A second predetermined current range 26 is defined by an upper limit $I_{ref,max}$ and a lower limit $I_{ref,min}$.

The reference current $I_{ref}$ at t=0 starts at a value of $I_{ref,com}$, which is determined when commissioning the wind turbine heating system. The reference current $I_{ref}$ gradually decreases due to a slight decrease in the electrical conductivity of the heating element 22. After several years, at $t=t_1$, the reference current $I_{ref}$ exceeds the lower limit $I_{ref,warn-}$ and is thus outside the first predetermined range 28. At this point in time, an action such as a notification sent to a service team may be appropriate.

Later, at $t=t_2$, the reference current $I_{ref}$ exceeds the lower limit $I_{ref,min}$ and is thus outside the second predetermined current range 26. At this point in time, an action such as stopping to apply a voltage to the heating element 22 or even stopping of the wind turbine 10 may be appropriate.

Figure 5:
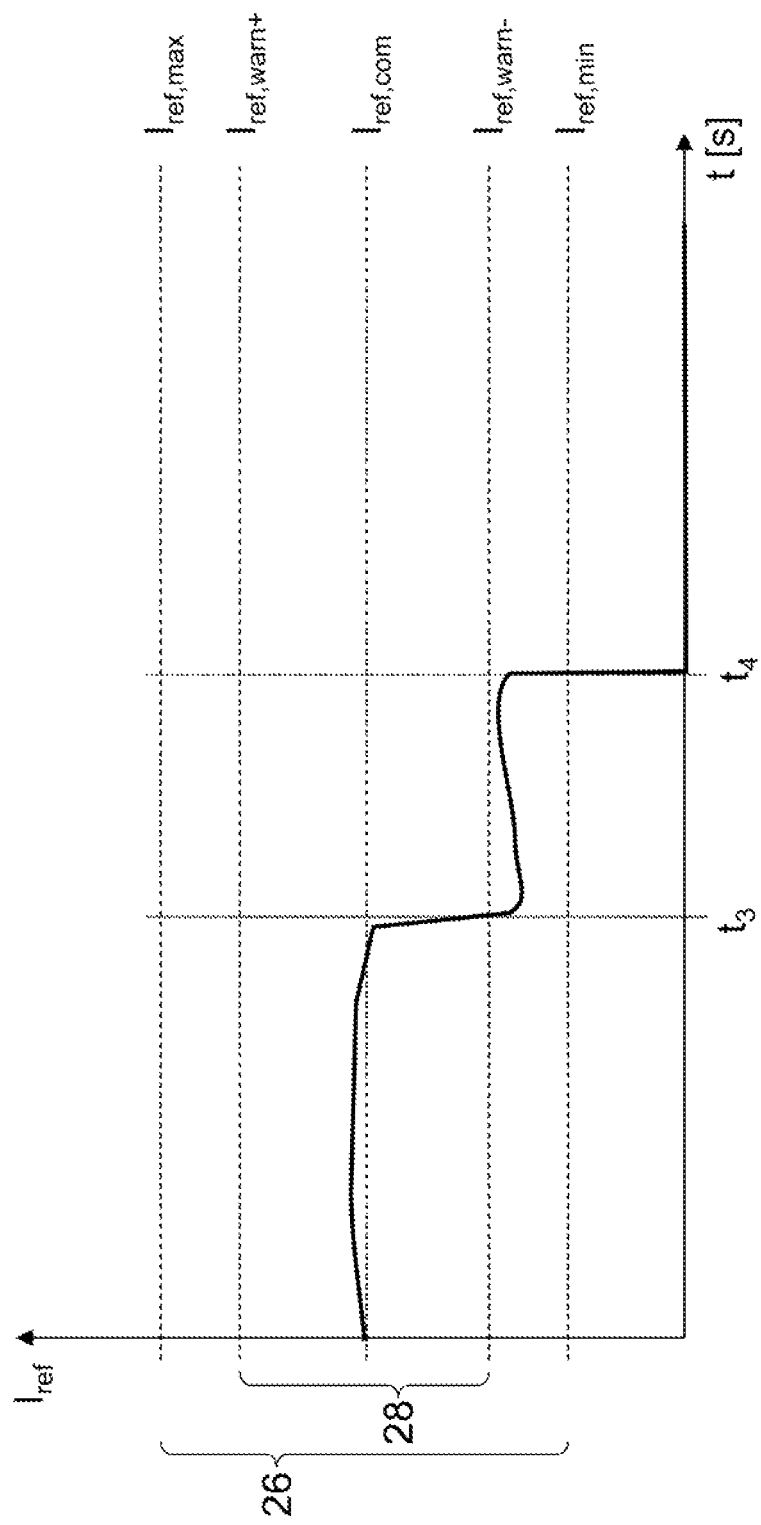
FIG. 5 is a diagram illustrating monitoring of a reference current over time; and, FIG. 6 shows development and implementation stages of a wind turbine rotor blade heating system.

FIG. 5 illustrates monitoring of a reference current over time. At $t=t_3$, the reference current $I_{ref}$ falls below the lower limit $I_{ref,warn-}$ and is thus outside the first predetermined current range 28, indicating a potential incident. At $t=t_4$, the reference current $I_{ref}$ falls below the lower limit $I_{ref,min}$ and is thus outside the second predetermined current range 26, indicating a potential loss of electrical connection.

FIG. 6 illustrates three stages of development, implementation and use of a wind turbine rotor blade heating system. In the first stage A (system configuration), the configuration of the system is determined. At this stage, the nominal voltage $U_{nom}$ and general limits of the electrical system such $I_{ref,max}$ and $I_{ref,min}$ will be determined, so that the first predetermined current range 28 can be defined.

In the second stage B (commissioning), the wind turbine heating system is commissioned. At this stage, an individual reference current value $I_{ref,com}$ is determined, in particular based on a measurement of the electrical resistance of the heating element 22 or alternatively based on a first measurement of the reference current taken by a power meter and transferred to the controller. The commissioner sets this individual reference current value $I_{ref,com}$ as the "center" of the range. The upper and lower limits $I_{ref,warn+}$ and $I_{ref,warn-}$ are calculated by adding/subtracting a fixed percentage, so that the predetermined current range 26 can be defined at this stage.

In the third stage C (monitoring), the reference current $I_{ref}$ is being monitored with the method, using $U_{meas}$ and $I_{meas}$ to calculate $I_{ref}$.

It is understood that the foregoing description is that of the preferred embodiments of the invention and that various changes and modifications may be made thereto without departing from the spirit and scope of the invention as defined in the appended claims.

LIST OF REFERENCE NUMERALS 10 wind turbine
12 tower
14 nacelle
16 wind turbine rotor
18 wind turbine rotor hub
20 wind turbine rotor blade
22 heating element
23 voltage meter
24 controller
25 current meter
26 second predetermined reference current range
28 first predetermined current range

The invention claimed is:

1. A method of operating an electrical heating element of a wind turbine rotor blade, the method comprising:
applying a voltage to the heating element;
measuring a current flowing through the heating element;
measuring the voltage applied to the heating element;
calculating a reference current by applying a normalization factor to the measured current, wherein the normalization factor corresponds to the ratio of a nominal voltage to the measured voltage; and,
triggering an action when the reference current is outside a first predetermined reference current range.

2. The method of claim 1, wherein the reference current is monitored over time by continuously repeating said measuring the current flowing through the heating element, said measuring the voltage applied to the heating element, and said calculating the reference current.

3. The method of claim 1, wherein at least one of no reference current is calculated and no action is triggered before the voltage has been applied to the heating element for a predetermined time.

4. The method of claim 1, wherein at least one of no reference current is calculated and no action is triggered when the measured current is below a predetermined threshold.

5. The method of claim 1, wherein at least one of no reference current is calculated and no action is triggered when the measured voltage is outside a predetermined voltage range.

6. The method of claim 1, wherein said measuring the voltage applied to the heating element includes repeated measurements and determination of an average voltage; and, wherein in said calculating the reference current, the average voltage is used as the measured voltage.

7. The method of claim 1, wherein said measuring the current flowing through the heating element includes repeated measurements and determination of an average current; and, wherein in said calculating the reference current, the average current is used as the measured current.

8. The method of claim 1, wherein the first predetermined reference current range is stored in a control system after having been determined during commissioning of a wind turbine rotor blade heating system which includes the heating element.

9. The method of claim 1, wherein the action triggered when the reference current is outside the first predetermined reference current range is at least one of: stopping applying a voltage to the heating element, stopping a wind turbine heating system which includes the heating element, stopping a wind turbine, sending a notification, and requesting a service team.

10. The method of claim 1 further comprising:
triggering an action when the reference current is outside a second predetermined reference current range defined by general limitations of an electrical supply system.

11. A wind turbine comprising:
a wind turbine rotor blade having an electrical heating element;
a controller configured to apply a voltage to the heating element;
a current meter configured to measure a current flowing through said heating element;
a voltage meter configured to measure the voltage applied to said heating element; and,
said controller being further configured to calculate a reference current by applying a normalization factor to the measured current, wherein the normalization factor corresponds to a ratio of a nominal voltage to the measured voltage, and to trigger an action when said reference current is outside a first predetermined reference current range.

12. The wind turbine of claim 11, wherein said controller is configured to monitor the reference current over time by repeatedly measuring the current flowing through said heating element via said current meter, measuring the voltage applied to said heating element, and calculating the reference current.

13. The wind turbine of claim 11, wherein said controller is configured to at least one of calculate no reference current and trigger no action before the voltage has been applied to said heating element for a predetermined time.

14. The wind turbine of claim 11, wherein said controller is configured to at least one of calculate no reference current and trigger no action when the measured current is below a predetermined threshold.

15. The wind turbine of claim 11, wherein said controller is configured to at least one of calculate no reference current and trigger no action when the measured voltage is outside a predetermined voltage range.

16. The wind turbine of claim 11, wherein said controller is configured to measure the voltage applied to said heating element by repeatedly measuring the voltage applied to said heating element via said voltage meter and determining an average voltage; and, wherein said controller is configured to, when calculating the reference current, use the average voltage as the measured voltage.

17. The wind turbine of claim 11, wherein said controller is configured to measure the current flowing through said heating element by repeatedly measuring the current flowing through said heating element via said current meter and determining of an average current; and, wherein in said calculating the reference current, the average current is used as the measured current.

18. The wind turbine of claim 11, wherein the first predetermined reference current range is stored in a control system after having been determined during commissioning of a wind turbine rotor blade heating system which includes said heating element.

19. The wind turbine of claim 11, wherein the action triggered when the reference current is outside the first predetermined reference current range is at least one of: stopping applying a voltage to the heating element, stopping a wind turbine heating system which includes the heating element, stopping the wind turbine, sending a notification, and requesting a service team.

20. The wind turbine of claim 11, wherein said controller is further configured to trigger an action when the reference current is outside a second predetermined reference current range defined by general limitations of an electrical supply system.

* * * * *